3,060,135
PRODUCTION OF EXPANDED POLYAMIDES
Friedrich Becke, Heidelberg, and Kurt Wick, Ludwigshafen (Rhine), Germany, assignors to Badische Anilin- & Soda-Fabrik Aktiengesellschaft, Ludwigshafen (Rhine), Germany
No Drawing. Filed Aug. 5, 1958, Ser. No. 753,217
Claims priority, application Germany Aug. 8, 1957
9 Claims. (Cl. 260—2.5)

This invention relates to the production of expanded polyamides.

The invention relates especially to the production of expanded polyamides by adding to the polyamide-forming substances a mixture of a carboxylic acid ester and a hydroxyalkyl-diamine and condensing the polyamide-forming substances in this mixture at temperatures above about 250° C.

The invention further relates to the production of expandable polyamides by condensing the polyamide-forming compounds at temperatures between about 150° and 240° C. in a mixture of these with carboxylic acid esters and hydroxyalkyl-diamines.

By polyamide-forming substances we mean linear polyamide-forming compounds or mixtures which form polyamides, such as dicarboxylic acid salts of diamines, for example adipic acid hexamethylene diamine, sebacic acid hexamethylene diamine or suberic acid octamethylene diamine, or also omega-aminocarboxylic acids, for example omega-aminocaproic acid. Polyamide-forming derivatives of these compounds are also suitable, for example caprolactam, oenanthic lactam or caprylic lactam or mixtures of various polyamide-forming compounds.

Suitable carboxylic acid esters are the esters of mono- or poly-carboxylic acids and monohydric aliphatic or cycloaliphatic alcohols with 1 to 6 carbon atoms. The esters of methanol and ethanol are preferred. Thus for example the esters of the following monocarboxylic acids may be used: ethyl benzoate, ethyl caprylate or methyl stearate. Methyl citrate is suitable as an ester of a polycarboxylic acid. The methyl or ethyl esters of dicarboxylic acids, as for example dimethyl oxalate, dimethyl glutarate, monoethyl adipate, dimethyl phthalate and dimethyl terephthalate may be used with special advantage.

Hydroxyalkyl-diamines are as a rule obtained by reaction of aldehydes, for example formaldehyde, or alkylene oxides, for example ethylene oxide, with aliphatic, cycloaliphatic or aromatic diamines, for example with ethylene diamine, hexamethylene diamine, diaminocyclohexane, diaminodicyclohexyl, piperazine or phenylene diamine. The diamines may also contain hetero atoms, as for example in bis-(omega-aminohexyl)-amine. The addition of the aldehydes or alkylene oxides to the diamines may be effected singly or multiply with the formation of ether alcohols at one or both amino groups. The hydroxyalkyldiamines accordingly correspond to the general formula:

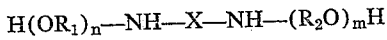

in which X is a divalent aliphatic, cycloaliphatic or aromatic radical, possibly containing a hetero atom. $R_1$ and $R_2$ are identical or different alkylene radicals with 1 to 4 carbon atoms. $n$ and $m$ are whole numbers between 1 and 7, or $n$ or $m$ but not both may also be zero. The hydroxyalkyl-diamines may also bear on nitrogen still further saturated or unsaturated aliphatic groups.

The amount of the mixture of hydroxyalkyl-diamine and carboxylic acid ester which is added to the polyamide-forming substances depends on the nature of the polyamide to be expanded and on the nature of the expanded article desired. In general it amounts to 0.5 to 20% by weight with reference to the weight of the polyamide-forming compounds. It is preferred to add the mixture in an amount of 1 to 10% by weight. The ratio of hydroxyalkyl-diamine to carboxylic acid ester may be varied within the limits 1:5 to 5:1. As a rule it is in fact recommended that equimolecular amounts of hydroxyalkyl-diamine and ester should be used; the hardness or plasticity of the expanded article may however be adjusted within wide limits by using one or other of these components in a molar excess. For example by an excess of hydroalkyl-diamine expanded articles are obtained having greater plasticity. The mixture of hydroxyalkyl-diamine and carboxylic acid ester may be added to the polyamide-forming compounds prior to or during the condensation. Provision must be made for intimate and uniform thorough mixing of the components. It is usual to work at normal pressure, but the condensation may be at increased or reduced pressure. The pressure under which the expanded articles cool should not be higher than that under which the condensation has taken place. It is sometimes advantageous to reduce the pressure toward the end of the condensation and to allow the product to cool under this pressure.

When the condensation takes place at temperatures above about 250° C., expanded polyamides are obtained in one operation from the polyamide-forming compounds. The condensation may however also first be carried out at temperatures below 250° C. at which no substantial expansion yet takes place, expansion of the condensate at temperatures above about 250° C. not being effected until toward the end of the condensation. It is preferable to carry out the expansion of the condensate at temperatures between about 270° C. and 280° C.

If the condensation is carried out at temperatures between about 150° C. and 240° C. until the condensate formed is still at least partly soluble in concentrated sulfuric acid, no appreciable expansion takes place because the carboxylic acid esters only decompose quite trivially in this temperature range. The resultant condensates are however still expandable and can be expanded as desired by later heating to temperatures above about 250° C., preferably by heating to 270° to 280° C. In the production of expandable polyamides there are first formed viscous compositions which must be thoroughly mixed at least periodically for the removal of water of reaction. This may be simply achieved by carrying out the condensation in a vessel with a strong stirrer or in a kneader capable of being heated. It is suitable to comminute the expandable polyamides to powders before they are expanded by the action of heat in molds of any desired shape.

By the process according to this invention very tough and rigid expanded articles are obtained, for example in the form of plates, rods or also hollow bodies in various shapes. The expanded articles may be sawn, bored, nailed or welded. They are suitable, inter alia, as insulating materials against heat and sound, as light building materials, as light packings or for the production of floats.

The following examples will further illustrate this invention but the invention is not restricted to these examples. The parts specified in the examples are parts by weight.

*Example 1*

100 parts of hexamethylene diamine adipate, 1.8 parts of N-(hydroxyethyl)-hexamethylene diamine and 2.2 parts of dimethyl terephthalate are well mixed and heated in a glass tube in an atmosphere free from oxygen for 5 hours at 280° C. After cooling, a pale yellowish colored expanded article with closed pores is obtained of which the bulk density amounts to 0.29 gram per cubic centimeter. It can be sawn, bored, nailed and welded with a hot tool or with a hot current of inert gas.

If 3 or 4 parts of N-(hydroxyethyl)-hexamethylene diamine are used instead of 1.8 parts thereof, an expanded article of greater elasticity is obtained.

Example 2

100 parts of hexamethylene diamine adipate, 2.3 parts of N-(hydroxyethyl)-hexamethylene diamine and 2.7 parts of dimethyl terephthalate are first heated for 2 hours at 245° C. in a rectangular iron mold coated with silicone lacquer. The temperature is then raised within 15 minutes to 280° C. and kept at this value for another 2½ hours. The expanded polyamide plate formed has a bulk density of 0.30 gram per cubic centimeter.

Example 3

60 parts of hexamethylene diamine adipate, 40 parts of caprolactam, 3 parts of N.N'-bis-(hydroxyethyl)-hexamethylene diamine, 3 parts of diethyl adipate are first heated for 4 hours in an oxygen-free atmosphere at 200° C. and then for 2 hours at 275° C. The expanded article obtained has larger pores than the articles prepared according to Examples 1 and 2. Its bulk density is 0.23 gram per cubic centimeter.

Example 4

100 parts of caprolactam, 3 parts of hexamethylene diamine adipate, 5 parts of water, 3.5 parts of N.N'-bis-(hydroxypropyl)-hexamethylene diamine and 2.5 parts of monoethyl adipate are heated for 2 hours at 275° C. in an oxygen-free atmosphere in a closed pressure vessel of refined steel. The pressure is then decompressed to atmospheric pressure within an hour and the temperature kept at 275° C. for another 2 hours. The expanded article formed has a bulk density of 0.15 gram per cubic centimeter.

Example 5

100 parts of hexamethylene diamine adipate, 1.8 parts of N-(hydroxyethyl)-hexamethylene diamine, 2.2 parts of dimethyl terephthalate are well mixed and heated in a refined steel vessel provided with a powerful stirrer in an oxygen-free atmosphere, first for 60 minutes at 200° C. and then for 30 minute at 250° C. After cooling, there is obtained a colorless lumpy mass having the K-value 54. This mass is comminuted to a powder while mixing in solid carbon dioxide. When the powder is heated in a mold under pure nitrogen for 3 hours at 275° C., an expanded article of the bulk density 0.28 is formed having a uniform pore structure throughout.

Example 6

100 parts of hexamethylene diamine adipate, 1.6 parts of N.N'-bis-(hydroxyethyl)-hexamethylene diamine, 1.6 parts of diethyl adipate are heated in a kneading apparatus in an oxygen-free atmosphere for 4 hours at 200° C. From this expandable polyamide (K-value 53) a uniform expanded article of the bulk density 0.24 can be obtained by heating to 280° C.

Example 7

60 parts of hexamethylene diamine adipate, 40 parts of caprolactam, 2.9 parts of N.N'-bis-(hydroxypropyl)-hexamethylene diamine, 42 parts of monomethyl adipate are heated in an oxygen-free atmosphere for 8 hours at 180° C. The expandable polyamide formed is converted by heating at 275° C. into an expanded article of the bulk density 0.19.

We claim:

1. A process for the production of expanded polyamides which comprises condensing a linear polyamide-forming compound selected from the group consisting of hexamethylene diamine adipate, hexamethylene diamine sebacate, octamethylene diamine subericate, omega-aminocaproic acid, caprolactam, oenanthic lactam, caprylic lactam and mixtures thereof in the presence of from 0.5 to 20% by weight with reference to said polyamide-forming compound of a mixture of (1) a carboxylic acid ester of an alcohol selected from the group consisting of methanol and ethanol and (2) a hydroxy-alkyl-diamine of the general formula

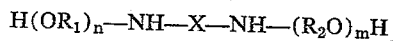

wherein X is a divalent hydrocarbon radical, $R_1$ and $R_2$ are alkylene radicals having 1 to 4 carbon atoms, $n$ is an integer of from 0 to 7, inclusive, and $m$ is an integer of from 1 to 7, inclusive, the ratio of (1) to (2) being within the limits of 1:5 and 5:1, and heating the condensate to a temperature of above 250° C.

2. A process as claimed in claim 1 wherein the condensation is carried out at a temperature between about 250° and 280° C.

3. A process as claimed in claim 1 wherein the condensation is carried out at a temperature between 150° and 240° C. and the temperature is elevated toward the end of the condensation to about 280° C.

4. A process as claimed in claim 1 wherein the alcohol forming the ester compound (1) is methanol.

5. A process as claimed in claim 1 wherein the alcohol forming the ester compound (1) is ethanol.

6. A process for the production of an expandable polyamide which comprises condensing a linear polyamide-forming compound selected from the group consisting of hexamethylene diamine adipate, hexamethylene diamine sebacate, octamethylene diamine subericate, omega-aminocaproic acid, caprolactam, oenanthic lactam, caprylic lactam and mixtures thereof in the presence of from 0.5 to 20% by weight with reference to said polyamide-forming compound of a mixture of (1) a carboxylic acid ester of an alcohol selected from the group consisting of methanol and ethanol and (2) a hydroxy-alkyl-diamine of the general formula

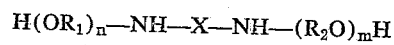

wherein X is a divalent hydrocarbon radical, $R_1$ and $R_2$ are alkylene radicals having 1 to 4 carbon atoms, $n$ is an integer of from 0 to 7, inclusive, and $m$ is an integer of from 1 to 7, inclusive, the ratio of (1) to (2) being within the limits of 1:5 to 5:1, said condensation being carried out at a temperature between about 150° C. and 240° C. until the condensate formed is at least still partly soluble in concentrated sulfuric acid.

7. A process as claimed in claim 6 wherein the quantity of said mixture of (1) and (2) is about 1 to 10% by weight with reference to said polyamide-forming compound.

8. The process as claimed in claim 6 wherein the polyamide-forming compound is hexamethylene diamine adipate.

9. The process as claimed in claim 6 wherein the polyamide-forming compound is caprolactam.

References Cited in the file of this patent

UNITED STATES PATENTS

| | | |
|---|---|---|
| 2,478,879 | Ten Broeck | Aug. 9, 1949 |
| 2,628,945 | Wayne | Feb. 17, 1953 |
| 2,681,321 | Stastny et al. | June 15, 1954 |